Sept. 21, 1965 R. C. TALBOT ETAL 3,207,288
CONVERGER AND STACKER FOR COOKIES
Filed Aug. 23, 1963 6 Sheets-Sheet 1

INVENTORS
RICHARD C. TALBOT
FRED RIEG
BY
ATTORNEYS

Sept. 21, 1965 R. C. TALBOT ETAL 3,207,288
CONVERGER AND STACKER FOR COOKIES
Filed Aug. 23, 1963 6 Sheets-Sheet 4

INVENTORS
RICHARD C. TALBOT
FRED RIEG
BY
ATTORNEYS

United States Patent Office 3,207,288
Patented Sept. 21, 1965

3,207,288
CONVERGER AND STACKER FOR COOKIES
Richard C. Talbot, Skokie, and Fred Rieg, Chicago, Ill.,
assignors to Peters Machinery Company, Chicago, Ill.,
a corporation of Illinois
Filed Aug. 23, 1963, Ser. No. 304,035
20 Claims. (Cl. 198—30)

This invention relates to improvements in mechanisms for arranging cookies in rows as they come out of a baking oven and the like, and stacking the rows of cookies for sandwiching or packing.

A principal object of the invention is to provide a simple and improved form of mechanism for transporting cookies from a baking oven and arranging the cookies in rows for ready packaging or sandwiching.

A further object of the invention is to provide a novel and improved form of mechanism arranging cookies in rows as they are delivered from a baking oven and stacking the cookies for sandwiching or packing by upending the cookies by the vibratory motion of vibratory conveyor troughs.

Another object is to provide a simplified mechanism for arranging cookies traveling along a conveyor in staggered relation with respect to each other into a reduced number of rows by the use of a series of converging power driven drive rollers, each pair of which rollers is arranged in plan in the general form of a V with the apex of the V facing in the direction of travel of the cookies, and by engaging the tops of the cookies by the rollers, as they pass to the rollers at random, and impelling the cookies into single rows.

A further object of the invention is to provide a simplified means for turning over cookies by gravity as they pass from a baking oven for stacking and packaging.

A still further object of the invention is to provide a simple and novel means for taking cookies delivered from a baking oven and converging the cookies in rows, in which cookies out of range of the converging means are sensed, and the converging means is moved into the range of travel of the cookies.

Still another object of the invention is to provide an improved form of means for conveying cookies from a baking oven to a sandwiching or packaging station, by providing a simplified arrangement of converging rollers in the paths of travel of the cookies, dividing rows of cookies travelling from a baking oven into half the number of rows conveyed from the baking oven, and by utilizing individual vibratory feeder troughs in association with the rows of cookies, for stacking the cookies by the vibratory motion of the feeder troughs as they are delivered for further processing.

A still further object of the invention is to provide a simple mechanism for arranging cookies in rows and turning over the cookies in certain rows while transporting the cookies for stacking, and stacking certain rows of cookies with the design side up and certain other rows of cookies with the design side down, and conveying the stacked cookies for sandwiching and the like.

These and other objects of the invention will appear from time to time as the following specification proceeds and with reference to the accompanying drawings wherein:

Figure 1:
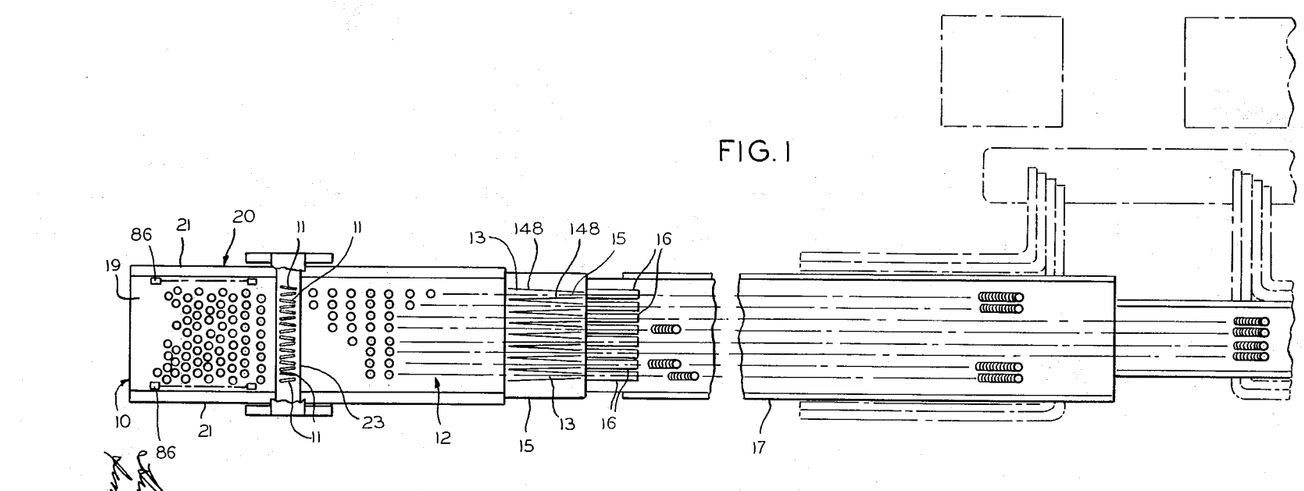
FIGURE 1 is a diagrammatic plan view illustrating a converger and stacker constructed in accordance with the principles of the present invention.

In the embodiment of the invention illustrated in the drawings, we have diagrammatically shown in FIGURE 1, a converger and stacker for cookies and the like, including a feed conveyor 10 receiving cookies deposited thereon from a baking oven conveyor and the like, and feeding the cookies to a series of converging rolls 11 extending across the discharge end thereof, converging sets of two rows of cookies into single rows and impelling the cookies in rows onto a discharge conveyor 12, discharging the cookies in rows into converging channel-like chutes 13 extending along an inclined slide 15. The chutes 13 in turn supply the cookies in rows to individual vibratory feeder troughs 16, upending and stacking the cookies by vibratory motion of the troughs, and discharging the stacked cookies onto an inclined elevating conveyor 17, for sandwiching or loading into packages and the like.

The feeder conveyor 10 may be in the form of a flat canvas belt 19 movable along a frame structure 20, between side frame member 21, 21 thereof, to a dead plate 23 beneath the converging rolls 11 and extending across the discharge end of the feeder conveyor 10.

Figure 5:
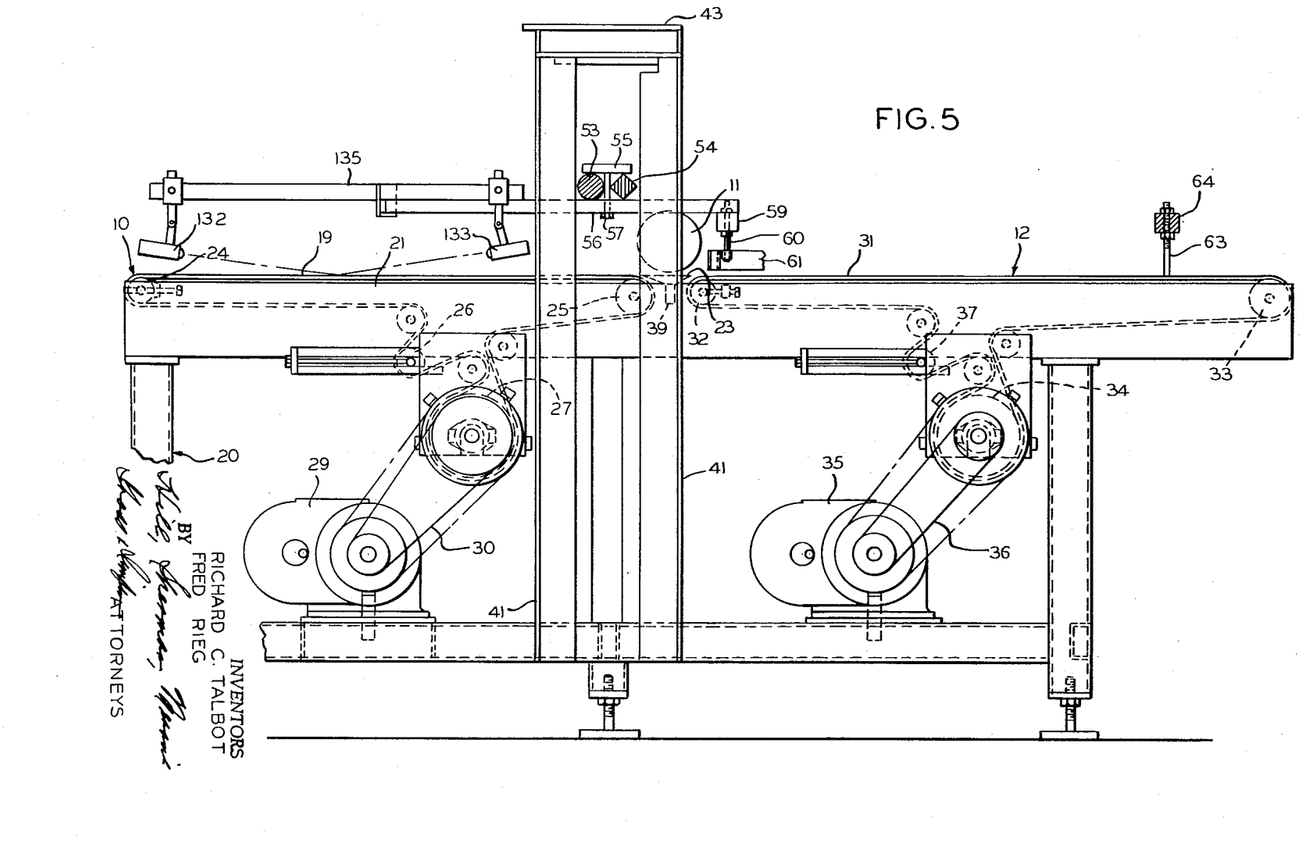
FIGURE 5 is an enlarged fragmentary view in side elevation of the converging mechanism, with certain parts broken away and certain other parts in section.

The canvas belt 19 is shown in FIGURE 5 as turning about a direction changing idler 24 at the receiving end of the conveyor, and as trained along the top of the frame structure 20 to the dead plate 23, and as turning about a direction changing idler 25 adjacent the dead plate 23 and partially lapped by said dead plate. The belt 21 is also trained about a take up idler 26 and a drive roll 27 driven from a motor 29 through a belt drive 30. The take-up idler 26 may be suitably biased into engagement with the belt 19, in a conventional manner, to maintain a required tension on the belt. The take-up is no part of the present invention so need not herein be shown or described in detail. The motor 29 may also be a speed reducer motor and may drive the drive roller 27 at the required speed, in a manner well known to those skilled in the art so not shown or described further herein.

The discharge conveyor 12 may also be a flat canvas belt conveyor, in which a conveyor belt 31 is trained about an idler roller 32 at the discharge end of the dead plate 23 and an idler roller 33 at the discharge end of the frame structure 20. The belt is trained about a drive pulley 34 driven from the motor 35 through a belt drive 36 in a manner similar to which the belt 19 is trained about the pulley 27 and driven from the motor 29. A take-up 37 is provided to maintain the belt under the desired tension. It should be noted that a greater reduction is shown in the drive to the belt 19 than in the drive to the belt 31 to drive the conveyor belt 31 at a higher rate of speed than the belt 19.

Figures 6, 7, 8:
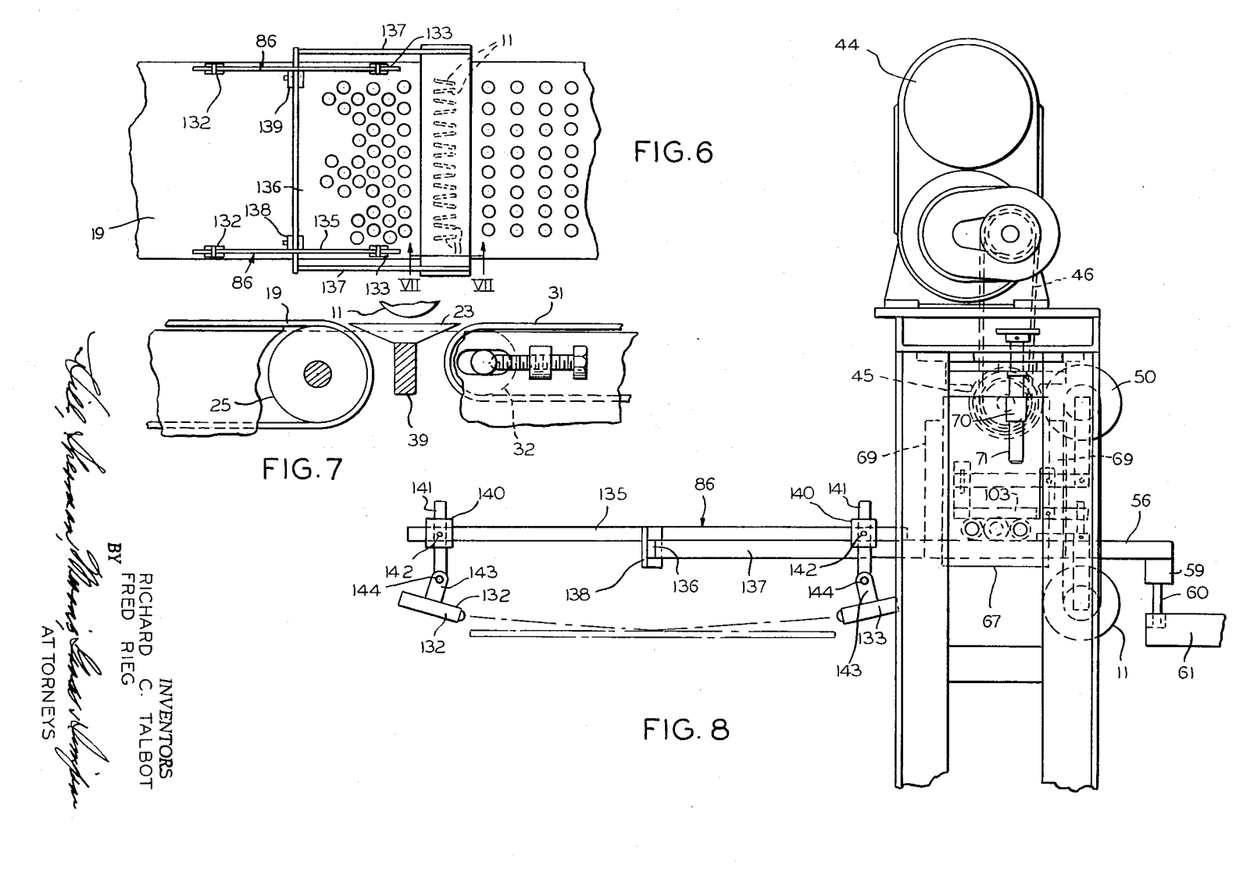
FIGURE 6 is a diagrammatic plan view of the converging mechanism.
FIGURE 7 is a fragmentary transverse sectional view taken substantially along line VII—VII of FIGURE 6, with certain parts removed and certain other parts shown in vertical section.
FIGURE 8 is a fragmentary detail view in side elevation of the converging mechanism showing the tracking mechanism and certain details of the support and drive means for the converging rollers.

The dead plate 23 is shown in FIGURES 5 and 7 as being mounted on a transverse bar 39 extending across the side frame members 21 and suitably secured thereto. The dead plate 23 has inclined undersurfaces converging to the bar 39 and partially lapping the conveyor belts 19 and 31 as they turn about their direction idlers, to position the top of said dead plate in alignment with said belt.

Figures 9, 10:
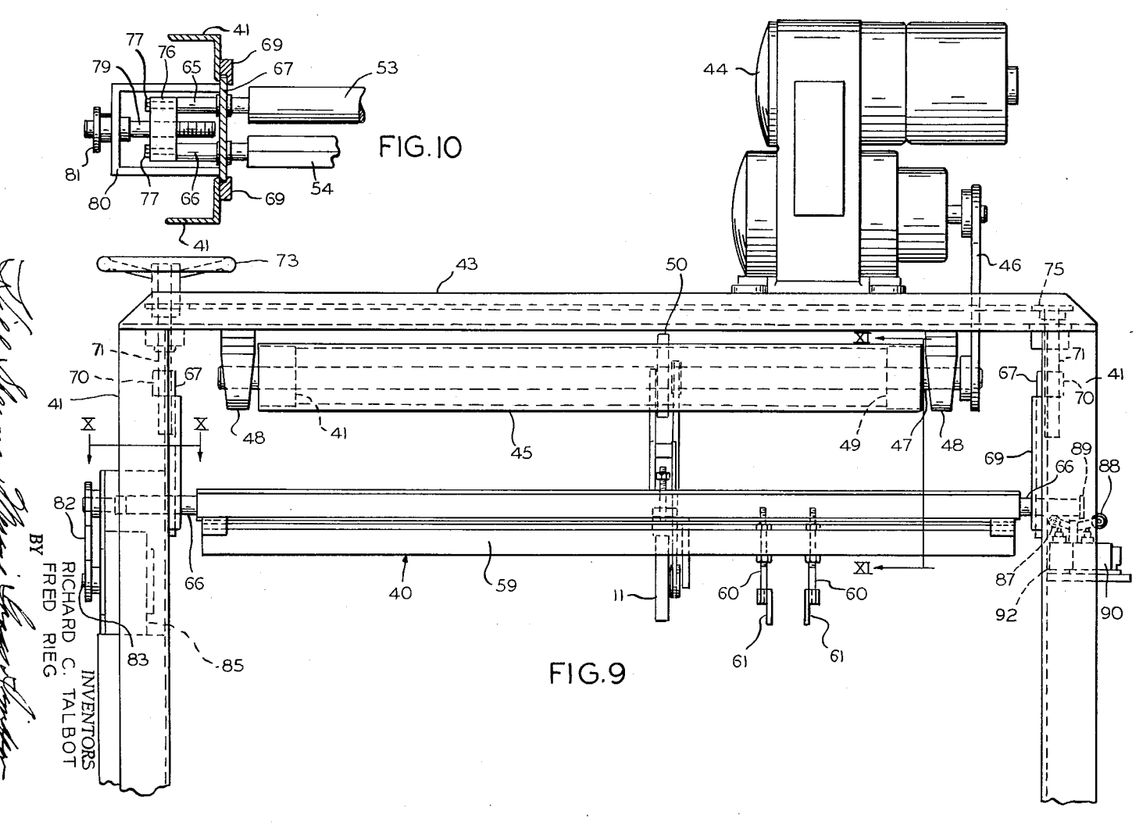
FIGURE 9 is a fragmentary end view of the converging apparatus with certain parts removed, in order to illustrate certain details of the support and drive for the converging rollers, not shown in FIGURE 8.
FIGURE 10 is an enlarged fragmentary detail sectional view taken substantially along line X—X of FIGURE 8, and illustrating certain details of the mechanism for moving the converging rollers into alignment with cookies on the feeder conveyor.
Figure 11:
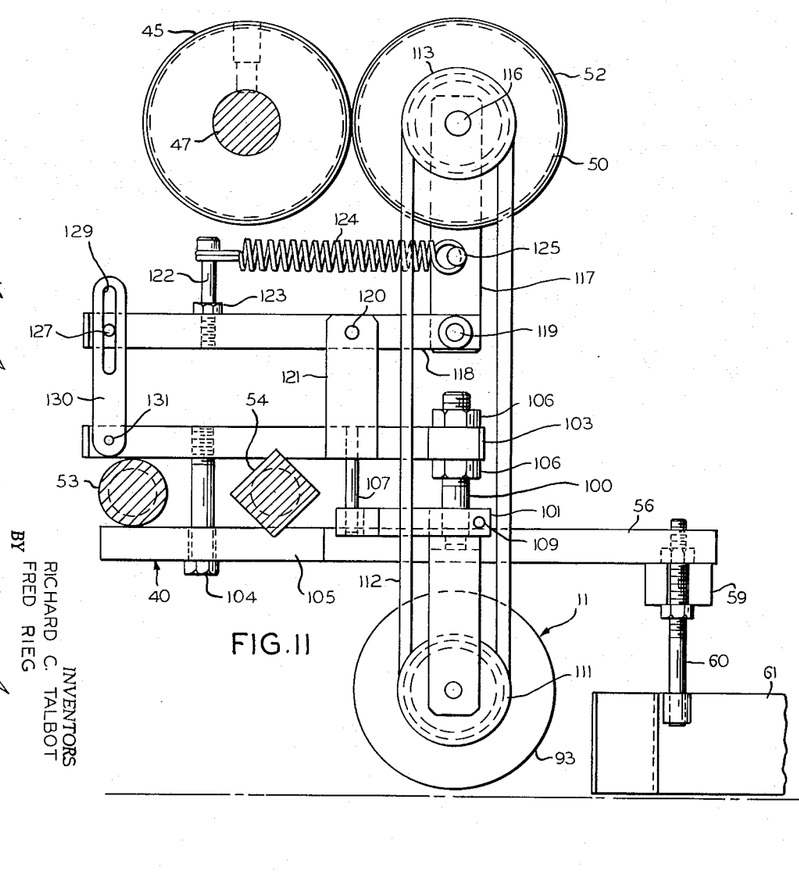
FIGURE 11 is an enlarged sectional view taken substantially along line XI—XI of FIGURE 6 and showing certain details of the support carriage for the rollers and the drive means therefor, not shown in FIGURES 5, 8 and 9.
Figure 12:
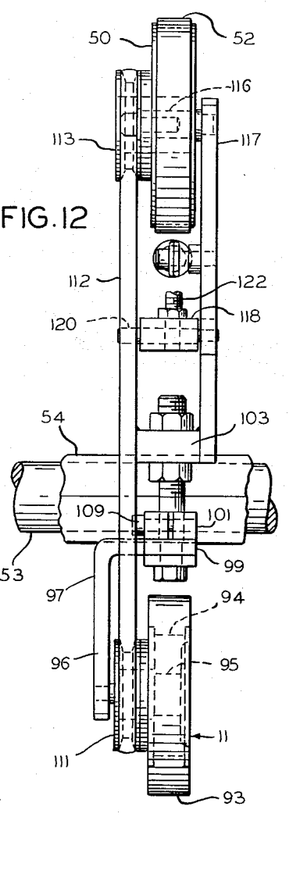
FIGURE 12 is a fragmentary end view of the support carriage for the converging rollers, showing certain other details of the support and drive to the converging rollers not shown in FIGURE 11.

The converging rollers 11 are mounted side by side on a carriage 40, supported between spaced posts or uprights in the form of longitudinally spaced angle irons 41, at each side of the frame structure 20 at the discharge end portion of the feeder conveyor 10 and at opposite ends of the dead plate 23. The angle irons 41 are connected together at their upper ends by a cross frame structure 43 forming a support for a drive motor 44. The motor 44 may be a speed reducer type of motor in which speed reducing mechanism is carried in a housing formed integrally with the motor housing, and serves to drive the drive roller 45 through a belt and pulley drive 46 at a selected speed. The drive roller 45 is mounted on a shaft 47 extending beyond opposite ends thereof, and journalled in bearing supports 48, 48 depending from the cross frame structure 43 (FIGURE 9).

The drive roller 45 serves as a common drive roller for the series of converging rollers 11 and may be in the form of a metal seamless tube closed at its ends by end closure members 49, 49 keyed or otherwise secured to the drive shaft 47. The drive roller 45 has driving engagement with a series of drive rollers 50, each of which drives an individual converging roller 11, and mounted on the carriage 40 in a manner which will hereinafter more clearly appear as this specification proceeds.

The drive rollers 50 may have resilient faces 52 forming friction faces engaging the drive roller 45. The faces of the drive rollers 50 may be made from rubber, polyurethane or from various other suitable friction materials, effecting a friction drive from the drive roller 45.

The carriage 40 includes a round support bar 53 extending across the dead plate 23 and a parallel rectangular support bar 54. The bars 53 and 54 are clamped together adjacent their outer ends with opposite corners of the rectangular bar facing vertically, as in FIGURE 5, by parallel spaced clamping bars 55 and 56 adjacent opposite end portions of the bars 53 and 54. The corners of the bar 54 are recessed in the facing faces of the clamping bars 55 and 56. Machine screws 57 extending between the bars 53 and 54 are shown as extending through the lower bar 56 and as being threaded in the upper bar 55, to clamp said bars to the bars 53 and 54, and to maintain the bars 53 and 54 in parallel spaced relation with respect to each other. The bar 56 is longer than the bar 55 and extends in advance of the carriage 40 over the receiving end of the conveyor 31. The bars 56 are connected together by a cross bar 59, shown in FIGURES 5, 8 and 9 as having a series of threaded rods 60 depending therefrom and forming connectors for the rear end portions of guides 61 connected at their forward ends to rods 63 mounted in and depending from a cross bar 64 extending across the conveyor 12 a substantial distance in advance of the angle irons 41, 41. The guides 61 may be used to align converged cakes with the chutes 13 on the slide 15.

The bars 53 and 54 respectively have shafts 65 and 66 extending from opposite ends thereof and slidably guided in support plates 67, 67. The support plates 67 are guided in gibbed guides 69, 69 extending along the inner end portions of the angle irons 41, 41 along the outsides of the legs thereof, and with said angle irons retaining the plates 67 for vertical adjustable movement along the angle irons 41, 41. The plates 67, 67 have lugs 70 extending outwardly from the upper end portions thereof. The lugs 70 are drilled and internally threaded and form nuts for adjustment screws 71, 71. The adjustment screw 71 on the side of the machine, which in FIGURE 9 is the left hand side of the machine, has a hand wheel 73 mounted on the upper end portion thereof and suitably secured thereto. The two screws 71 are suitably held from vertical movement and are connected together by a chain and sprocket drive 75, so that turning of the hand wheel 73 will rotatably move the two screws 71 together and simultaneously raise or lower the plates 67, 67, equal distances, to vary the positions of the converging rollers 11 with respect to the top of the dead plate 23.

The shafts 65 and 66 at the side of the machine, which in FIGURE 9 is the left hand side of the machine, are connected together by a threaded cross bar 76 as by machine screws 77 threaded in the ends of said shafts. The cross bar 76 is drilled and threaded along an axis parallel to the axes of the shafts 65 and 66 and forms a nut for an adjusting screw 79 extending through a yoke 80 and suitably journalled therein. A sprocket 81 is keyed or otherwise secured to the outer end of the adjustment screw 79 and is meshed with a chain 82 driven from a sprocket (not shown) on a shaft 83 of a speed reducer motor 85, commonly called a gear head motor. The motor 85 is energized under the control of tracking devices 86, 86 extending along each side of the belt 19 of the conveyor 10, and moving the carriage 40 laterally to register the converging rollers 11 with the cookies on the belt 19.

It should here be understood that the oven conveyor is usually a metal belt conveyor and that due to the heat of the oven, the conveyor frequently is misaligned or warped, with the result that the cookies are not always discharged on the belt conveyor 10 in the proper relation. The cookies, therefore, may be closer to one side of the belt than the other and the cookies along the side of the belt may be out of range of the outer converging rollers 11. The motor 85 and tracking devices 86, therefore, serve to move the carriage 40 and converging rollers 11 laterally in either direction to bring the converging rollers into range of the cookies on the belt 19, as will hereinafter more clearly appear as this specification proceeds.

Two switch arms 87 and 88 are mounted between the opposite angles 41, from the gear head motor 85 for operating associated limit switches, to deenergize the gear head motor 85. The arm 88 is engaged by a plate 89, mounted on the ends of the right hand shafts 65 and 66 upon movement of the carriage 40 to the right, and serves to open a limit switch 90 and limit movement of said carriage in a right hand direction. The arm 87 is engaged by the plate 89 upon movement of the carriage to the left and serves to open a similar limit switch 92 and limit movement of said carriage in a left hand direction.

Referring now to the converging rollers 11 and their mountings on the carriage 40, the rollers 11 and the mountings therefore are similar, so one roller only and its mounting and drive need herein be shown and described. The roller 11 has a relatively soft yieldable face, which may be in the form of an annular piece of polyurethane foam material 93, mounted on a hub or spider 94, suitably journalled on a horizontal shaft 95, mounted on and extending outwardly of a vertical leg 96 of a swivel mounting bracket 97. A threaded shaft 100 extends vertically of a horizontal leg 99 of the swivel 97 through a lock bar 101 abutting the top of the horizontal leg 99, and through a vertically spaced clamping bar 103, abutting the top surface of the round support bar 53, and recessed within the top corner of the rectangular support bar 54, and clamped thereto as by a clamping screw 104. The clamping screw 104 extends through a lower clamping bar 105 and is threaded at its upper end in the upper clamping bar 103. Nuts 106, 106 threaded on the threaded shaft 100 and abutting opposite sides of the bar 103 are provided to retain the shaft 100 in position.

The lock bar 101 is mounted at its lower end on a pin 107 suitably secured to and depending from the bar 103. The lock bar 101 has a split forward end portion, the split portion of which registers with the apertured portion of said lock bar, through which the threaded shaft 100 extends. A machine screw 109 extends through the split forward end portion of the lock bar 101 and is threaded therein to bring the split portions of the bar together and clamp said bar to the shaft 100.

While the converging wheel 11 is shown as extending parallel to the bar 103, for convenience in illustrating the invention, in operation this wheel is turned at an angle with respect to the bar 103, to position the wheel with its next adjacent wheel to form converging paths in the direction of travel of the conveyors 10 and 12, with the apex of the converging paths on the dead plate 23 and facing the conveyor 12. When the wheel 11 is in the proper position, it is locked in position by the locking screw 109 and the nuts 106, 106.

The spider or hub 94 has a pulley 111 formed integrally therewith. The pulley 111 is a V-groove type of pulley and is engaged by a V-belt 112 trained about a pulley 113 formed integrally with the drive roller 50. The drive roller 50 has driving engagement with the face of the drive roller 45 and is journalled on a shaft 116 mounted on and extending from the upper end of a support and tensioning lever 117. The tensioning lever 117 is pivotally mounted at its lower end on an arm 118 on a pivot pin 119. The arm 118 is pivotally mounted intermediate its ends on a pivot pin 120 mounted at its opposite ends in upright brackets 121, welded or otherwise secured to opposite sides of the clamping bar 103 and extending upwardly therefrom along opposite sides of the lever arm 118. The lever arm 118 has a connector 122 in the form of a machine screw threaded therein on the opposite side of the pivot pin 120 from the pivot pin 119, and extending upwardly of said lever arm. The connector 122 is locked in place as by a lock nut 123 and has a tension spring 124 connected thereto at one end, and connected at its opposite end to a connector pin 125, extending from the arm 117. The spring 124 thus serves to maintain the drive roll 50 into engagement with the face of the drive roller 45 to be driven therefrom.

The lever arm 118 has a rearwardly spaced pin 127 extending laterally therefrom through a slot 129 in a link 130, pivoted to the clamping bar 103 at its lower end, as by a pivot pin 131. The pin 127 may be a threaded pin and the slot 129 accommodates movement of the lever arm 118 about the axis of the trunnion pin 120, to tighten or loosen the belt 112. The pin 127 may be a threaded pin and may have a nut (not shown) threaded thereon to retain the lever arm 118 in position and to retain the belt 112 at the required tension.

Referring now in particular to the tracking devices 86, extending along opposite sides of the belt 19 of the conveyor 10 and compensating for errors in tracking of the oven band, or any intermediate conveyor between the oven band and the feed or converging conveyor 10, said tracking devices include scanning heads in the form of photoelectric cells 132 on each side of the conveyor belt 19 and a light source 133 in association with each photoelectric cell and directing a beam of light along each side of the conveyor belt, broken by cookies, which are out of place on the conveyor 10, due to errors in tracking of the oven band. As shown in FIGURES 5, 6 and 8, each associated photoelectric cell 132 and source of light 133 is mounted at opposite ends of a bar 135 extending longitudinally of the conveyor belt 19 along one side thereof. The bars 135 are in turn mounted on a cross bar 136, supported at its opposite ends on the rear end portions of support bars 137, secured to the outer sides of the lower clamping bars 56 and extending rearwardly therefrom. Brackets 138 mount the bars 135 to extend across the top of the cross bar 136 for adjustable movement therealong, in accordance with the width of the feed conveyor belt 19.

The photoelectric cells 132 and light sources 133 are mounted for adjustable movement along the bars 135 on hangers 140 adjustably retaining depending arms 141 thereto, as by adjustment screws 142. Brackets 143 are pivotally mounted on the lower ends of the arms 141 on bolts 144 and are retained in position on said arms upon tightening of said bolts.

As cookies are traveling with the belt 19 and are out of range of the outer converging rollers 11, due to errors in tracking of the oven band, and as a cookie breaks the light beam, the motor 85 will be energized to move the entire carriage 40, tracking devices 86 and conveying rolls 11 until the light beam is again completed. Cookies out of place on the opposite side of the belt, when breaking the light beam projected by the opposite source of light 133, will effect movement of the carriage 40 in an opposite direction. Thus, as the light beam on the side of the belt which in FIGURE 6 is the right hand side of the belt is broken by cookies out of place on the belt 10, the carriage 40 will move to the right to bring the source of light outside of the line of cookies on the belt 19 and accommodate the light beam to be completed. As the light beam is broken by cookies on the opposite side of the belt, the carriage 40 will move to the left to bring the tracking devices outwardly along the belt outside of the line of travel of the cookies that may be deposited thereon.

The controls from the photoelectric cells 132 to the gear head motor 85 may be conventional controls in which the gear head motor is energized under the control of photoelectric relays (not shown) to rotate in one direction or another, and are no part of the present invention so need not herein be shown or described in detail.

The converging rolls may rotate at the speed of linear travel of the conveyor 10 or a slightly greater speed and the conveyor 12 may travel at substantially twice the speed of travel of the conveyor 10, to make room for the cookies impelled thereto by the coverging rolls 11 and draw the cookies into straight lines for stacking.

Figure 2:
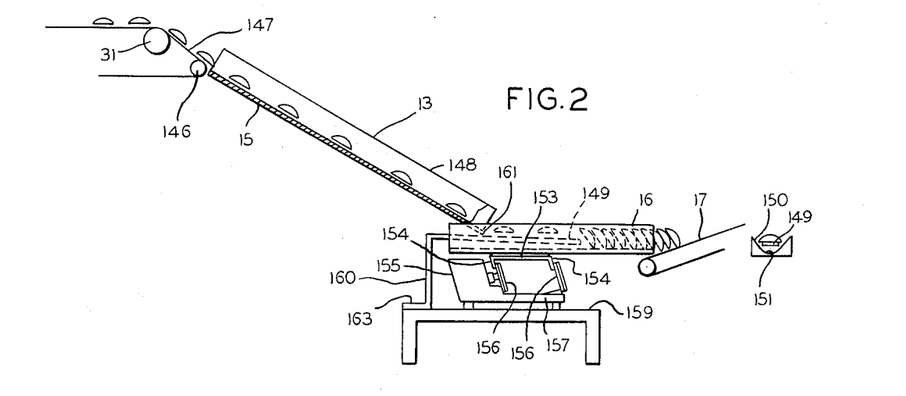
FIGURE 2 is a diagrammatic view in side elevation of a portion of the stacker shown in FIGURE 1, showing the discharge of a row of cookies design face up for stacking, and illustrating the delivery of the stacked cookies in an elevating conveyor.
Figure 3:
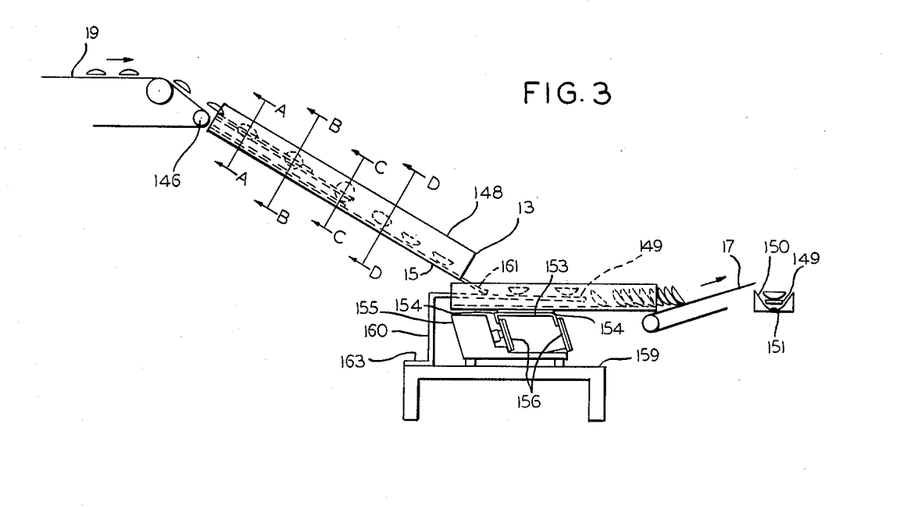
FIGURE 3 is a view somewhat similar to FIGURE 2, but showing the cookies stacked with the design face of the cookies trailing, and illustrating a turnover means for turning over certain of the aligned cookies.

As shown in FIGURE 5, the belt 31 of the conveyor 12 turns directly about a direction idler 33. This direction idler is in material discharge relation with respect to a slide 15, inclinded downwardly of said conveyor, as shown in FIGURES 1, 2 and 3, for discharging the cookies in rows in the converging chutes extending along said slide. We have, however, shown a modification of our invention in FIGURES 2 and 3, providing a more gradual discharge onto the slide 15. In this modification, the conveyor belt 31 passes over the top of the idler 33 downwardly and forwardly therefrom to and about a small diameter roll 146. This provides an inclined run 147 of the conveyor at substantially the angle of the slide 15 for discharging the cookies or cakes directly thereon to slide along said slide onto the vibratory troughs 16 for stacking.

As diagrammatically shown in FIGURE 1, a converging chute 13 is provided for each row of cookies. The converging chutes 13 may be in the form of sheet metal side walls 148 extending along the slide 15, a greater distance than the width of the cookies and converging at their discharge ends to distances slightly greater than the widths of the cookies, to effect the sliding of the cookies directly onto slide plates 149, spaced above the bottoms of the vibratory troughs 16, to accommodate the cookies to slide over the ends thereof into an associated trough, to be upended and maintained in a generally upended position and conveyed along said trough by the vibratory action thereof.

Each vibratory trough 16 has oppositely inclined side walls 150, converging to a rounded bottom 151, conforming generally to the edge of a cookie. Each trough 16 is mounted on a generally U-shaped vibratory driver 153 of a vibratory drive mechanism 155. The driver 153 has parallel depending inclined legs depending from the bottom of the trough 16 and secured at their lower ends to inclined leaf springs 156, mounted at their lower ends on a base 157 for the vibratory drive mechanism. The base 157 in turn is mounted on a stand 159 which may be mounted on the foundation for the apparatus.

The vibratory drive mechanism is of a conventional form, for imparting high frequency vibratory motion to the driver 153 and the trough 16, upon energization of the mechanism, to convey the cookies onto the inclined elevating conveyor 17 and to upend the cookies by the vibratory action of said trough and the retarding of the cookies as discharged onto the receiving end of the inclined elevating conveyor. Since the vibratory drive mechanism is of a conventional form, the mechanism itself need not herein be shown or described in detail.

The slide 149 is inclined at a slight angle and is shown as being the generally horizontal leg of a modified form of generally Z-shaped structure having a vertical leg 160 and a bottom horizontal leg 163 extending in an opposite direction from the leg or slide 149, and suitably mounted on top of the stand 159. The vertical leg 160 spaces the leg or slide 149 above the top of the stand 159 to extend along the trough 16 at a slight incline and form a continuation of a finger 161 extending forwardly of the chute 15 into the trough 16. The slide 149, receiving the cookies discharged from the chute 15 along the finger 161 thus retains the cookies in a flat position, which in FIGURE 2 is a position with the design facing upwardly, and accommodates the cookies to slide therealong and slide off the end thereof, with the design facing the direction of travel of the cookies, the vibratory motion of the trough 16, maintaining the cookies in the upended position shown in FIGURE 2 as retarded by discharge onto the receiving end of the inclined elevating conveyor 17, effects the discharge of the cookies, in stacked relation onto the conveyor 17. The stacked cookies continue their travel onto and along the conveyor 17 and pass upwardly along the conveyor for removal in stacks for loading in trays or boxes, or for sandwiching prior to packaging.

The inclined conveyor 17 may be a canvas belt conveyor like the conveyors 10 and 12, and is of a conventional construction, so need not herein be shown or described in detail.

Where the cookies are to be delivered by the conveyor 17 for packaging, they are usually all stacked with design side leading. Where, however, it may be desired to sandwich the cookies, the cookies in half of the rows are delivered to the conveyor 17 design side leading, and the cookies in the other half of the rows are delivered to the conveyor 17, design side trailing. Thus, when the cookies reach the sandwiching machine they may be discharged in groups, design side leading and design side trailing, for readily placing together for sandwiching.

Figure 4:
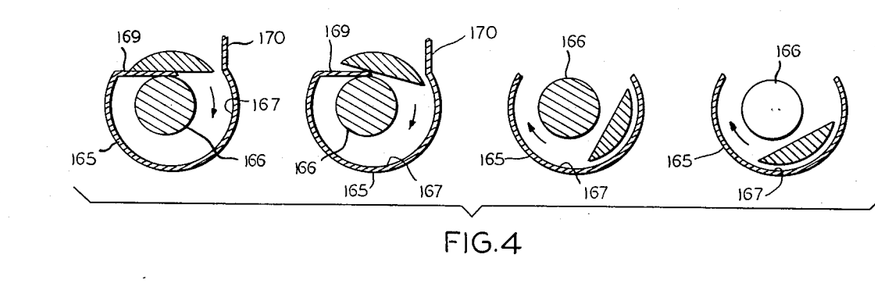
FIGURE 4 is a series of fragmentary sectional views taken along lines A—A, B—B, C—C and D—D of FIGURE 3.

A means is provided in half of the chutes 16 for turning the cookies over as they are delivered to said chutes, to pass downwardly along said chutes with the design side down. This turnover means is shown in FIGURES 3 and 4 as comprising a tubular member 165 extending along the associated converging chute 13. The tubular member is cut away along its top for the length thereof. A rod 166 is shown in FIGURE 4 as extending along the tube 165 and spaced from an inner wall 167 thereof. A slide plate 169 extends along the top surface of one edge of the open top of the tube 165 to and along the top surface of the rod 160 and converges towards its lower end to support the cookies design side up, as discharged from the conveyor 12, to slide downwardly therealong and accommodate the cookies to drop downwardly about the inner edge thereof and turn over in the space between the outer periphery of the rod 166 and the inner wall 167 of the tube, as shown in sections A, B, C and D of FIGURE 3. The edge of the wall 167 opposite from the slide plate 169 has a generally vertical side wall 170 extending therealong for a part of the length thereof, to retain the cookies to said tube as discharged thereon.

A simplified means has thus been provided for receiving the cookies discharged from the conveyor 19 and turning the cookies over by gravity as they pass downwardly along the slide plate 169 into the space between the rod 166 and inner wall 167 of the tube 165, to be discharged for continued movement along the associated chute 13 onto the slide plate 149 for stacking in the manner shown in FIGURE 3.

It may be seen from the foregoing that a simple and improved mechanism has been provided for taking freshly baked cookies delivered from a baking oven in staggered relation with respect to each other and dividing the rows of cookies in half and aligning the cookies in rows, and then delivering the cookies for stacking design side up or both design side up and design side down, depending upon the further operations to be performed on the cookies.

It may further be seen that the dividing and aligning of the cookies in rows is effected by soft faced rollers arranged in converging relation with respect to each other in the direction of travel of the cookies and rotatably driven to engage the tops of the cookies and impel the cookies from double rows into single rows to a discharge conveyor carrying away the cookies in rows from the soft faced rollers, and that selected rows of cookies are turned over by a simplified sliding action in which the cookies drop sideways into a turnover tube and all of the cookies are stacked by the vibratory action of the vibratory troughs 16 upending the cookies and progressing the cookies for packing or other treatment.

While we have herein shown and described one form in which our invention may be embodied, it may readily be understood that various variations and modifications in the invention may be attained without departing from the spirit and scope of the novel concepts thereof.

We claim as our invention:

1. In an apparatus for converging cookies travelling along a travelling surface into uniform rows, at least two converging rollers having relatively soft faces spaced above the surface a distance sufficient to engage the top surfaces of the cookies, and rotatably driven about horizontal axes diverging in the direction of travel of the cookies and positioning the rollers to converge in the direction of travel of the cookies and thereby impel and align the cookies into single rows.

2. In an apparatus for converging rows of cookies, travelling along a travelling surface into a reduced number of uniform rows, at least two converging rollers having relatively soft faces spaced above the surface along which the cookies travel, a distance slightly less than the thickness of the cookies, means rotatably driving said rollers at the same rates of speed, and means positioning said rollers to converge in the direction of travel of said cookies and impel the cookies into a single row.

3. In an apparatus for converging rows of cookies travelling along a travelling surface into a reduced number of uniform rows, a stationary plate at the terminal end of the travelling surface, at least two converging rollers having relatively soft faces spaced above the stationary plate a distance sufficient to engage the top surfaces of the cookies, means rotatably driving said rollers at the same rates of speed to impel cookies along the stationary plate, and means supporting said two rollers to rotate about horizontal axes in paths of travel converging in the direction of travel of the cookies.

4. In an apparatus for converging cookies into rows, a travelling surface receiving cookies in staggered relation with respect to each other, a stationary plate at the discharge end of the travelling surface, a second travelling surface leading from said stationary plate and travelling at a greater speed than the first surface, at least two converging rollers having relatively soft faces in vertical alignment with and spaced above the stationary plate, means rotatably driving said rollers at the same rates of speed in the direction travel of the cookies, and means supporting said rollers for rotation about horizontal axes diverging in the direction of travel of the cookies and positioning said rollers to converge in the direction of travel of the cookies and impel cookies passing onto said stationary plate onto said second travelling surface in single rows.

5. In a converger for cookies and the like, a flat conveyor for the cookies having the cookies placed thereon in staggered relation with respect to each other, and means for converging the cookies at the discharge end of said conveyor into a reduced number of rows, comprising a series of converging rollers having relatively soft peripheries and rotatably driven about horizontal axes in the direction of travel of the cookies, each two rollers being spaced above the top surface of the cookies, and means positioning said rollers at converging angles to impel and direct the cookies into a single line.

6. In a converger for cookies and the like, a flat belt conveyor having cookies deposited thereon, and means at the discharge end of said conveyor for impelling the cookies into a reduced number of rows, comprising a series of power driven rollers having soft faces, and spaced above and extending transversely of said conveyor, means rotatably driving said rollers about horizontal axes in the direction of travel of said conveyor and at a higher peripheral speed than the speed of said conveyor, and means supporting each two rollers of said series of rollers to converge in the direction of travel of the conveyor, to engage the top surfaces of the cookies and impel at least two rows of cookies into single rows.

7. In a converger and stacker for cookies and the like, a flat belt conveyor having cookies thereon in rows, and means at the discharge end of said conveyor for arranging the cookies into a reduced number of rows, comprising a series of converging rollers extending transversely of said conveyor and having soft resilient faces spaced above said conveyor a distance slightly less than the thickness of a cookie thereon, means rotatably driving said rollers in the direction of travel of the cookies along said conveyor, means suporting each two rollers of said series of rollers for rotation about a horizontal axes disposed in opposite angular relation wtih respect to each other and positioning said rollers to converge in the direction of travel of said conveyor, a second conveyor leading from said converging rollers and drawing the cookies from said rollers, and vibratory chute means upending and stacking the cookies and feeding the cookies for further treatment.

8. In a converger and stacker for cookies and the like, a flat belt conveyor having cookies deposited thereon in rows, a flat plate extending along the discharge end of said conveyor, a second conveyor extending from said plate and driven at a higher rate of speed than said first conveyor, means extending over said plate impelling cookies onto said second conveyor in alignment with each other comprising a series of converging rollers extending along said plate and having soft peripheries spaced above said plate distances slightly less than the thickness of a cookie, means rotatably driving said rollers in the direction of travel of the cookies along said first conveyor, support means for said rollers supporting each two rollers of said series of rollers for rotation about horizontal axes disposed in opposite angular relation with respect to each other and positioning said rollers to converge to a general apex, facing said second conveyor, and vibratory chute means at the discharge end of said second conveyor and in association with each two converging rollers, for upending and stacking the cookies by the vibratory action thereof.

9. In a converger and stacker for cookies and the like, a flat belt conveyor feeding cookies placed thereon in staggered relation with respect to each other, an inclined elevating conveyor spaced in advance of said flat belt conveyor and disposed therebeneath, means disposed between the discharge end of said flat belt conveyor and said inclined elevating conveyor for reducing the number of rows of cookies, other means stacking and discharging the stacked cookies onto said inclined elevating conveyor, comprising at flat plate extending across the discharge end of said flat belt conveyor, a second belt conveyor extending from said flat plate, a series of converging rollers disposed above said flat plate in vertical alignment therewith and rotatably driven about horizontal axes positioned to position each two rollers of said series of rollers into the general form of a V in plan with the apex thereof facing said second conveyor, a plurality of vibratory stacking troughs at the discharge end of said second conveyor and in material discharge relation with respect to said inclined elevating conveyor, and means discharging the individual rows of cookies onto individual of said vibratory troughs, to effect stacking thereof by the vibratory motion of said troughs.

10. A converger for cookies and the like, comprising a flat belt conveyor having cookies thereon, a flat plate extending along the discharge end of said conveyor, a second conveyor extending from said plate, a carriage supported above said plate for adjustable movement transversely thereof, a series of rollers supported on said carriage in vertical alignment with said plate and having soft impelling surfaces spaced above said plate a distance slightly less than the thickness of a cookie, and adjustable support means for said rollers on said carriage positioning each two rollers of said series of rollers to converge toward an apex facing said second conveyor.

11. A converger for cookies and the like, comprising a flat belt conveyor having cookies placed thereon in staggered relation with respect to each other, a flat plate extending along the discharge end of said conveyor, a second conveyor extending from said plate, a carriage supported above said plate for movement transversely thereof, a series of rollers extending across said plate in vertical alignment therewith and having soft impelling surfaces spaced above said plate a distance slightly less than the thickness of a cookie, means supporting said rollers on said carriage for movement therewith, said support means being adjustable to position each two rollers of said series of rollers to converge toward an apex facing said second conveyor and to vertically adjust said rollers with respect to said plate in accordance with the thickness of the cookies discharge thereon by said first conveyor.

12. A converger for cookies and the like, comprising a flat belt conveyor, a flat plate extending along the discharge end of said conveyor, a second conveyor extending from said plate, a carriage supported above said plate for movement transversely thereof, a series of rollers supported on said carriage in vertical alignment with said plate and having soft impelling surfaces spaced above said plate a distance slightly less than the thickness of a cookie, means rotatably driving said rollers in the direction of travel of the cookies along said first conveyor, means supporting said rollers on said carriage to accommodate the positioning of each two rollers of said series of rollers to converge toward an apex facing said second conveyor, and means moving said carriage and rollers laterally along said plate in accordance with the position of cookies on said first belt conveyor to maintain said rollers in operative association with the cookies discharged onto said plate.

13. A converger for cookies and the like, comprising a flat belt conveyor, a flat plate extending along the discharge end of said conveyor, a second conveyor extending from said plate, a carriage supported above said plate for movement transversely thereof, a series of rollers supported on said carriage in vertical alignment with said plate and having soft impelling surfaces spaced above said plate a distance slightly less than the thickness of a cookie, means rotatably driving said rollers in the direction of travel of the cookies along said first conveyor, means supporting said rollers on said carriage to accommodate the positioning of each two rollers of said series of rollers to converge toward an apex facing said second conveyor, means sensing the cookies traveling along said belt, and means operable by said sensing means for moving said carriage and rollers into operative association with the cookies traveling along said belt.

14. A converger for cookies and the like, comprising a flat belt conveyor, a flat plate extending along the discharge end of said conveyor, a second conveyor extending from said plate, a carriage supported above said plate for movement transversely thereof, a series of rollers supported on said carriage in vertical alignment with said plate and having soft impelling surfaces spaced above said plate a distance slightly less than the thickness of a cookie, means rotatably driving said rollers in the direction of travel of the cookies along said first conveyor, means supporting said rollers on said carriage to accommodate the positioning of each two rollers of said series of rollers to converge toward an apex facing said second conveyor, means extending along opposite edges of said belt for sensing the cookies thereon, and means operable under the control of said sensing means for moving said carriage and rollers laterally of said plate and maintaining said rollers in operative association with the cookies discharged onto said plate.

15. A converger for cookies and the like, comprising a flat belt conveyor, a flat plate extending along the discharge end of said conveyor, a second conveyor extending from said plate, a carriage supported above said plate for movement transversely thereof, a series of rollers supported on said carriage in vertical alignment with said plate and having soft impelling surfaces spaced above said plate a distance slightly less than the thickness of a cookie, means rotatably driving said rollers in the direction of travel of the cookies along said first conveyor, means supporting said rollers on said carriage to accommodate the position of each two rollers of said series of rollers to converge toward an apex facing said second conveyor, means sensing the cookies at the edge portions of said belt comprising a source of light and a photoelectric cell extending along each edge portion of said belt and projecting beams of light along the edge portions of said belt broken by cookies out of range of the end converging rollers, and effecting the movement of said carriage laterally in one direction or another upon the breaking of either light beam, to move said carriage laterally and maintain said converging rollers in operative association with the cookies traveling along said conveyor.

16. A stacker for cookies and the like, comprising a generally horizontally extending vibratory conveyor trough having opposite inclined sides and a bottom generally conforming to the peripheries of the cookies, an inclined conveyor extending upwardly of the discharge end of said trough, an inclined chute discharging cookies onto said trough, a slide plate extending along said trough for a portion of the length thereof in material receiving relation with respect to said inclined chute and spaced above the bottom of said trough and receiving the cookies one side up and discharging the cookies onto said trough at the end thereof, to accommodate the vibratory motion of said trough to upend the cookies discharged from the slide plate and convey the cookies along said trough in stacked relation with respect to each other, and an inclined elevating conveyor at the discharge end of said vibratory trough, drawing the cookies from said trough and maintaining the cookies in stacked relation with respect to each other.

17. A stacker for cookies and the like, stacking cookies for sandwiching comprising a plurality of vibratory troughs arranged in side by side relation with respect to each other, an upwardly inclined conveyor at the discharge ends of said troughs conveying and maintaining the stacked cookies in stacked relation with respect to each other, an inclined slide having a plurality of chutes extending therealong each chute being in material discharge relation with respect to a vibratory trough, a conveyor discharging rows of cookies along said chutes for movement therealong onto said vibratory troughs, and means in association with certain of said chutes for turning the cookies over for discharge on the associated vibratory troughs upside down comprising a semi-cylindrical turnover tube extending along a selected of said channels, said turnover tube being open at its top and having a cookie supporting slide extending partially across the open top thereof and along said turnover tube for a portion of the length thereof, and accommodating the cookies to slide downwardly therealong, drop off the side of said slide and be turned over by the contour of said tube.

18. A stacker in accordance with claim 17 in which the turn over tubes have rods extending therealong for a portion of the length thereof having the cookie supporting slides extending along the top surfaces of said rods and converging toward the discharge ends of said tubes, to accommodate the cookies moving along said slide plates to drop into said chutes and be turned over by the conforming contours of said rods and tubes and move along the associated chutes for discharge onto the associated vibratory troughs upside down.

19. Stacking means for cookies and the like, comprising a generally horizontally extending vibratory conveyor trough having a half round bottom generally conforming to the margin of the cookies, means discharging cookies onto said trough with a selected side up, means vibrating said trough to effect the travel of cookies therealong, and an upwardly inclined elevating conveyor at the discharge end of said trough retarding travel of the cookies at the discharge end of said vibratory trough as the cookies are discharged onto said conveyor and effecting the raising of the cookies upwardly along their leading edges by the vibratory action of said vibratory trough, to cause the leading end of one cookie to pass under the trailing portion of the next advance cookie and thereby effect the stacking of the cookies as said inclined elevating conveyor draws the cookies from said vibratory trough.

20. Stacking means for cookies and the like, comprising a generally horizontally extending vibratory conveyor trough having a half-round bottom generally conforming to the periphery of the cookies, a slide extending along said trough between the sides thereof and spaced upwardly from the bottom thereof for a portion of the length thereof, means discharging cookies onto said slide one side up, means for vibrating said trough with a high frequency vibratory action to effect the movement of cookies along said trough from the receiving to the discharge end thereof, and a conveyor at the discharge end of said vibratory trough retarding the travel of the cookies as discharged thereonto and effecting the raising of the cookies about their leading edges by the vibratory action of said vibratory trough with the leading end of one cookie passing beneath the trailing portion of the next adjacent cookie to effect stacking of the cookies as discharged onto said conveyor and the conveying of the stacked cookies by said conveyor.

References Cited by the Examiner

UNITED STATES PATENTS

| 1,685,354 | 9/28 | Elfving | 198—30 X |
| 2,245,913 | 6/41 | Gridley. | |
| 2,555,602 | 6/51 | Nutt | 198—30 X |
| 2,596,228 | 5/52 | Fletcher | 198—30 |
| 2,955,698 | 10/60 | Packman | 198—30 X |
| 3,002,617 | 10/61 | Fraenkel | 198—30 X |

FOREIGN PATENTS 81,038  11/52  Norway.

SAMUEL F. COLEMAN, *Primary Examiner.*

EDWARD A. SROKA, *Examiner.*